United States Patent [19]

Kremidas

[11] Patent Number: 5,155,653

[45] Date of Patent: Oct. 13, 1992

[54] CAPACITIVE PRESSURE SENSOR

[75] Inventor: James R. Kremidas, Fenton, Mich.

[73] Assignee: MacLean-Fogg Company, Mundelem, Ill.

[21] Appl. No.: 745,221

[22] Filed: Aug. 14, 1991

[51] Int. Cl.⁵ .......................... G01L 9/12; H01G 7/00
[52] U.S. Cl. ...................................... 361/283; 73/718
[58] Field of Search .................... 73/718, 724; 361/283

[56]  References Cited

U.S. PATENT DOCUMENTS

| | | | |
|---|---|---|---|
| 2,714,703 | 8/1955 | Ruderfer | 323/74 |
| 3,405,559 | 10/1968 | Moffatt | 73/398 |
| 3,479,879 | 11/1969 | Music | 73/398 |
| 3,595,084 | 7/1971 | Bailey | 73/398 |
| 3,634,727 | 1/1972 | Polye | 361/283 |
| 3,715,638 | 2/1973 | Polye | 361/283 |
| 3,748,571 | 7/1973 | Kurtz | 323/74 |
| 3,750,476 | 8/1973 | Brown | 73/398 |
| 3,808,480 | 4/1974 | Johnston | 361/283 |
| 3,858,097 | 12/1974 | Polye | 361/283 |
| 3,993,939 | 11/1976 | Slavin | 361/283 |
| 4,064,550 | 12/1977 | Dias | 361/283 |
| 4,089,036 | 5/1978 | Geronime | 361/283 |
| 4,125,027 | 11/1978 | Clark | 73/724 |
| 4,151,578 | 4/1979 | Bell | 361/283 |
| 4,158,217 | 6/1979 | Bell | 361/283 |
| 4,177,496 | 12/1979 | Bell | 361/283 |
| 4,207,604 | 6/1980 | Bell | 361/283 |
| 4,295,376 | 10/1981 | Bell | 73/724 |
| 4,388,668 | 6/1983 | Bell | 361/283 |
| 4,426,673 | 1/1984 | Bell | 361/283 |
| 4,562,742 | 1/1986 | Belel | 73/718 |

OTHER PUBLICATIONS

"Measuring Systems Application and Design", Ernest Doebelim, 3rd Edition, McGraw Hill, pp. 422-436.

Primary Examiner—Donald Griffin
Attorney, Agent, or Firm—Krass & Young

[57]  ABSTRACT

A capacitive pressure sensor including a housing defining a chamber; a seal structure within the housing dividing the chamber into a central pressure chamber and a measurement chamber; a diaphragm positioned within the chamber with a central portion of the diaphragm positioned in the pressure chamber and an annular peripheral portion of the diaphragm positioned in the measurement chamber; and a measurement circuit including an annular electrode carried by the lower face of the annular portion of the diaphragm coacting with a further electrode carried by a confronting portion of the housing and operative to generate an output signal which varies in proportion to the deflection of the diaphragm in response to exposure of the opposite faces of the diaphragm to differential pressures.

19 Claims, 4 Drawing Sheets

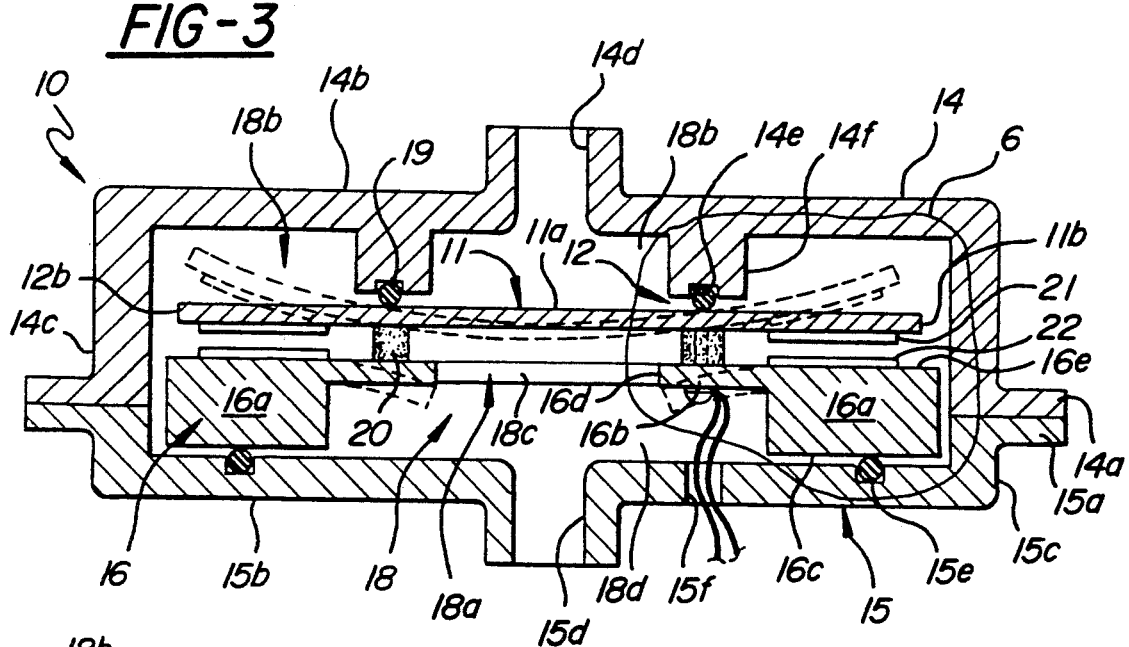
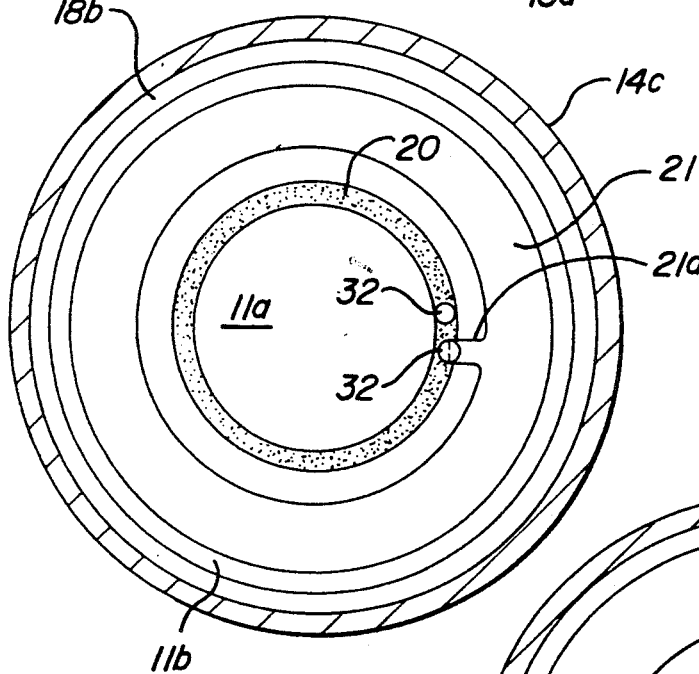
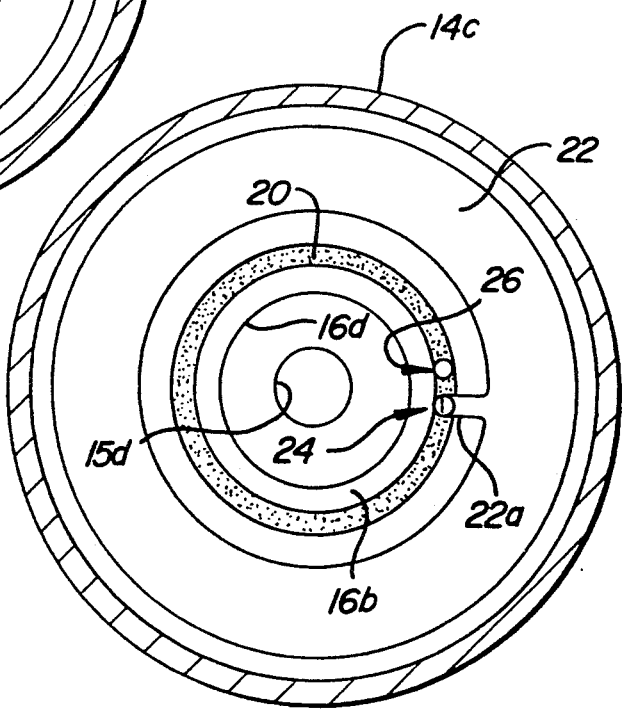

CAPACITIVE PRESSURE SENSOR

BACKGROUND OF THE INVENTION

This invention relates to pressure transducers and more particularly to capacitive pressure sensors.

It is often necessary to determine the pressure of gases and liquids for purposes of measurement or control and many transducers and sensors have been proposed to facilitate the determination of the pressure of gases and liquids. One general type of transducer or sensor for such applications is a capacitive sensor in which the pressure is sensed and measured based on a change in the spacing between electrodes which in turn varies the output signal of an electrical circuit including the electrodes.

Whereas many types of capacitive sensors have been designed and made commercially available, and whereas the various capacitive sensors have proven to be generally satisfactory, they embody a relatively complex construction and/or require a very complex manufacturing procedure and, as such, tend to be relatively expensive and prone to quality control problems.

SUMMARY OF THE INVENTION

This invention is directed to the provision of a capacitive pressure sensor having a simple, inexpensive and effective design.

The invention sensor, broadly considered, comprises a housing assembly defining a pressure chamber and a measurement chamber sealed from the pressure chamber and a diaphragm assembly having a primary portion positioned in the pressure chamber and a supplemental portion positioned in the measurement chamber. This arrangement separates the pressure sensing and the measurement functions of the sensor and simplifies the capacitive sensor design.

According to a further feature of the invention, the sensor includes an electrical circuit including a pair of electrodes with one electrode carried by the supplemental portion of the diaphragm assembly. This arrangement further simplifies the construction of the capacitive sensor.

According to a further feature of the invention, the primary portion of the diaphragm assembly is adapted to flex in response to variations in the sensed pressure, the supplemental portion of the diaphragm assembly flexes in response to flexing of the primary portion, and flexing of the supplemental portion of the diaphragm assembly varies the spacing between the pair of electrodes to thereby vary the output signal of the electrical circuit. This arrangement provides a simple and inexpensive construction for generating an output signal which varies in accordance with the sensed pressure.

According to a further feature of the invention, the measurement chamber is annular and the supplemental diaphragm portion is also annular. This arrangement provides a compact and efficient packaging for the sensor.

According to a further feature of the invention, the electrodes are annular with one of the electrodes carried by the supplemental diaphragm portion and the other electrode carried by a confronting portion of the sensor. This arrangement further optimizes the simplicity and compactness of the sensor.

In one disclosed embodiment of the sensor, the annular measurement chamber within the housing assembly is sealed from the central pressure chamber within the housing assembly by an annular seal and the diaphragm passes through the seal to position the primary and supplemental portions of the diaphragm respectively in the pressure chamber and in the measurement chamber.

In another disclosed embodiment of the sensor, the sensor includes upper and lower substrate members and the diaphragm assembly has a sandwich construction including upper and lower diaphragm portions of the upper and lower substrate members sandwiching a diaphragm plate therebetween carrying electrodes positioned in the measurement chamber.

BRIEF DESCRIPTION OF THE DRAWINGS

FIG. 3 is a cross sectional view of the invention sensor;

FIGS. 4 and 5 are cross sectional views taken on lines 4—4 and 5—5 of FIG. 3;

DETAILED DESCRIPTION OF THE PREFERRED EMBODIMENT

Figure 1:
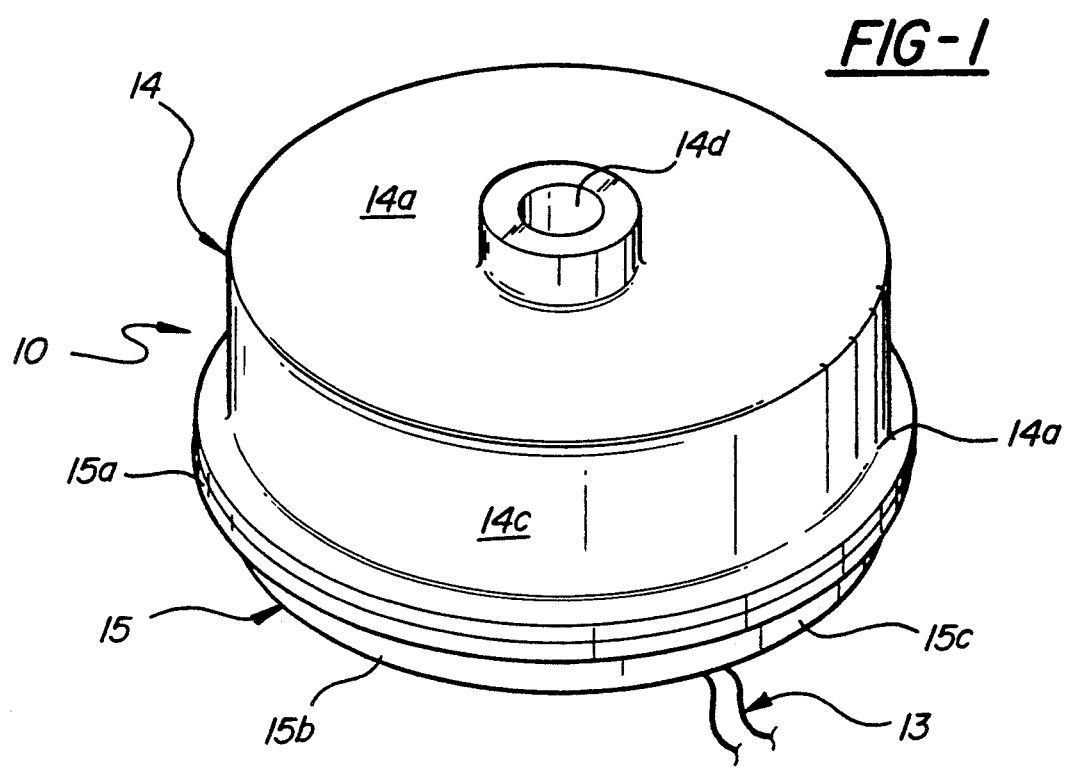
FIG. 1 is a perspective view of a capacitive sensor according to the invention.
Figure 2:
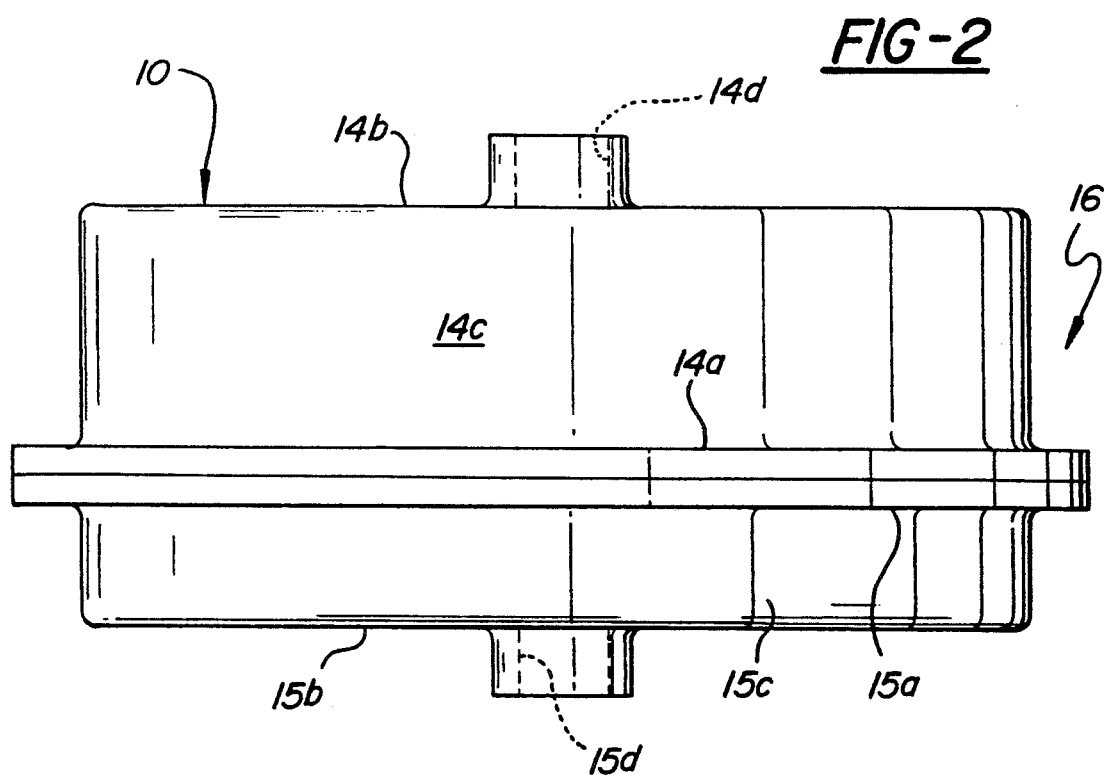
FIG. 2 is a side elevational view of the invention sensor.
Figure 6:
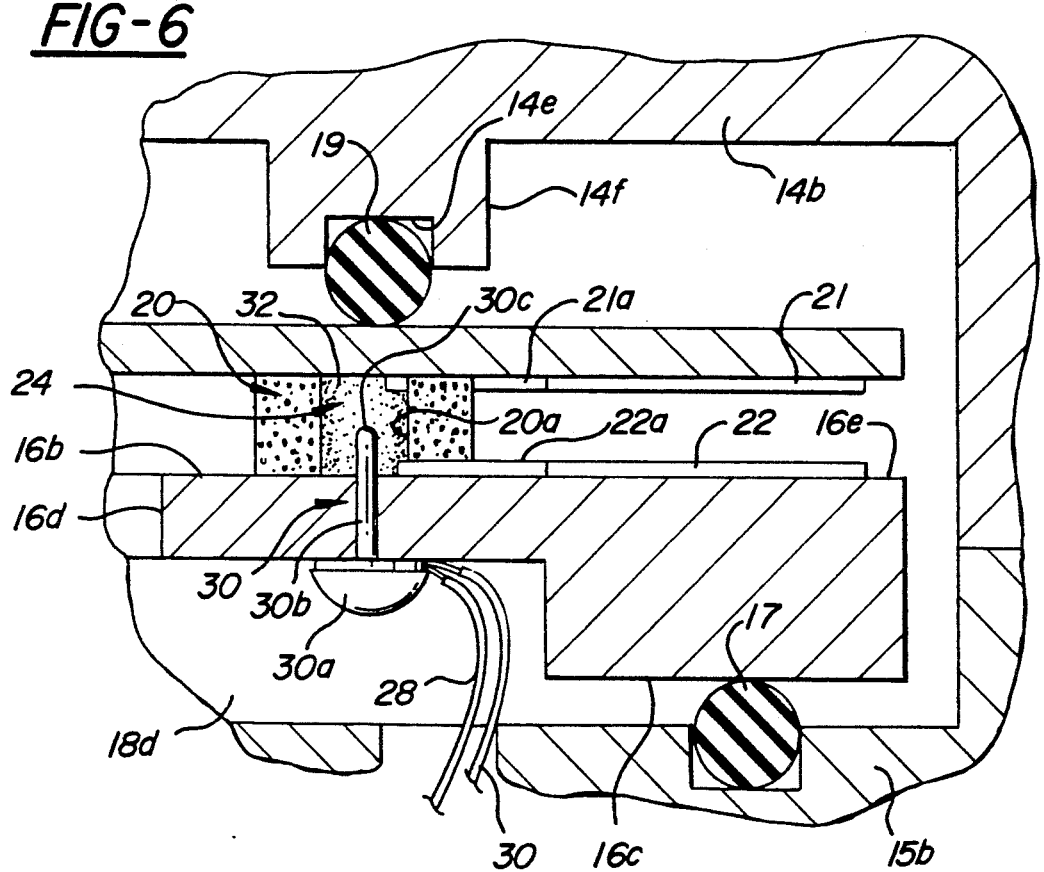
FIG. 6 is a detail view taken within the circle 6 of FIG. 3.

The invention sensor of FIGS. 1–6, broadly considered, includes a housing assembly 10, a diaphragm 11, sealing means 12, and a measurement circuit 13.

Housing assembly 10 includes upper and lower housings 14 and 15 suitably joined at flange portions 14a and 15a and a substrate member 16 seated within housing member 15. Housing members 14 and 15 are preferably formed of a metal or plastic material and substrate member 16 is preferably formed of a ceramic material such as alumina.

Upper housing 14 is generally cylindrical and cup-shaped and includes an upper wall 14b, an annular side wall 14c, and a pressure port 14d formed centrally in upper wall 14a.

Lower housing member 15 is also generally cylindrical and cup-shaped and includes a lower wall 15b, an annular side wall 15c, and a pressure port 15d formed centrally in lower wall 15b.

Substrate member 16 is annular and includes a relatively thick outer annular portion 16a and a thin annular ledge or lip portion 16b extending radially inwardly in cantilever fashion from the radially inner edge of outer portion 16a. The lower face 16c of substrate member portion 16a bears against an O-ring 17 seated in a groove 15e in the lower wall 15b of lower housing member 15.

Housing members 14 and 15 and substrate 16 will be seen to coact to define a hollow or chamber 18 within the housing assembly.

Diaphragm 11 has a circular, disk shaped configuration and comprises a flat plate formed, for example, of stainless steel or a ceramic such as alumina.

Sealing means 14 comprises an O-ring 19, seated in an annular downwardly facing groove 14e formed at the lower annular face of an annular interior wall portion 14f of upper the housing member 14, and an annular seal 20 comprising an annular fused glass frit formation.

O-ring 19 and glass frit 20 coact to divide chamber 18 into a central pressure chamber 18a and an annular measurement chamber 18b surrounding central pressure chamber 18a, and diaphragm 11 passes through sealing means 14, between the annular lower face of O-ring 19 and the annular upper face of glass frit 20, to position the central or primary portion 11a of the diaphragm within the pressure chamber 18a and position the annular outer peripheral portion 11b of the diaphragm within the annular measurement chamber 18b.

The central or primary portion 11a of diaphragm 11 will be seen to divide pressure chamber 18a into an upper pressure chamber 18b in communication with pressure port 14d and a lower pressure chamber 18c in communication with pressure port 15d. Thus, the central portion 11a of the diaphragm will flex upwardly or downwardly in response to differences in the pressure communicated to the pressure chamber portions 18b and 18c through their respective ports 14d and 15d and the annular outer peripheral portion 11b of the diaphragm will flex upwardly or downwardly, in inverse relation to the movement of the central portion, as shown by the solid and dotted lines of FIG. 3.

Specifically, the dotted line positions of FIG. 3 illustrate the situation wherein the pressure communicated to the upper pressure chamber 18b via port 14d exceeds the pressure communicated to the lower pressure chamber 18c via port 15d so that the central, primary portion 11a of the diaphragm is flexed downwardly and the outer annular peripheral portion 11b of the diaphragm is flexed upwardly.

Annular glass frit 20 will be seen to be provided on the upper face of annular ledge portion 16b of the substrate member. Ledge portion 16b will be seen to provide the upper boundary of a circular lower chamber 18d communicating at its lower end with pressure port 15d and communicating at its upper end through circular opening 16d with lower pressure chamber 18c. Ledge portion 16b, by virtue of its cantilever mounting relative to the substrate portion 16a, flexes upwardly or downwardly (see dashed lines of FIG. 3) with the flexing movement of diaphragm 11 so as to augment the gross flexing movement of the diaphragm in response to a particular sensed pressure differential and thereby augment the sensitivity of the sensor.

Measurement circuit 13 includes upper and lower electrodes 21 and 22, terminal means 24 and 26, and leads 28 and 30.

Upper electrode 21 is annular and is positioned on the lower face of annular diaphragm portion 11b and includes a radially inwardly extending lead portion 21a.

Lower electrode 22 is annular and is positioned on the annular upper surface 16e of the substrate member portion 16a in underlying confronting relation to electrode 21 and includes a radially inwardly extending lead portion 22a.

Electrodes 21 and 22 are applied to the lower face of annular diaphragm portion 11b and to the substrate surface 16e, respectively, by screen printing utilizing, for example, a gold conductive material.

Terminal means 24 includes a conductive pin 30 and conductive epoxy material 32. Pin 30 has a head portion 30a positioned beneath ledge 16b and a shank portion 30b extending upwardly through an aperture in ledge 16b. Conductive epoxy material 32 is positioned in an aperture 20a in annular glass frit 20 and in surrounding relation to the upper tip 30c of pin 30. Lead portion 22a of electrode 22 extends beneath glass frit 20 to make electrical conductive contact with the conductive epoxy material 32 so as to complete a conductive electrical circuit from electrode 22 to head 30a of pin 30.

Terminal means 26 is spaced circumferentially from terminal means 24; includes conductive epoxy material 32 positioned in an opening 20a in glass frit 20; includes a pin 30 having a shank portion 30b extending upwardly through the substrate ledge 16b to dispose the upper tip 30c of the pin within the epoxy material 32; and is arranged such that the lead portion 21a of electrode 21 makes electrical contact with epoxy material 32 so as to establish an electrical circuit extending between the electrode 21 and the head 30a of the pin associated with the terminal means 26. Lead 28 is received beneath the head 30a of the pin 30 associated with terminal means 24 and lead 30 is received beneath the head 30a of the pin 30 associated with terminal means 26. Leads 28 and 30 extend outwardly from lower chamber 18d through a port 15f in the lower wall 15b of lower housing member 15 for connection into a suitable measuring circuit for measuring a relevant value or characteristic of the circuit.

It will be understood that, in use, the pressure ports 14d and 15d are respectively connected to respective gas or fluid mediums so that the central or primary portion 11a of the diaphragm will flex upwardly or downwardly in proportion to the difference in the pressures of the sensed mediums and so that the annular outer peripheral portion 11b of the diaphragm will flex upwardly or downwardly to vary the spacing between electrodes 21 and 22 in proportion to the sensed pressure differential and thereby vary the output signal generated in the circuit 13 in proportion to the difference in the pressures of the gas or fluid mediums.

Figure 7:
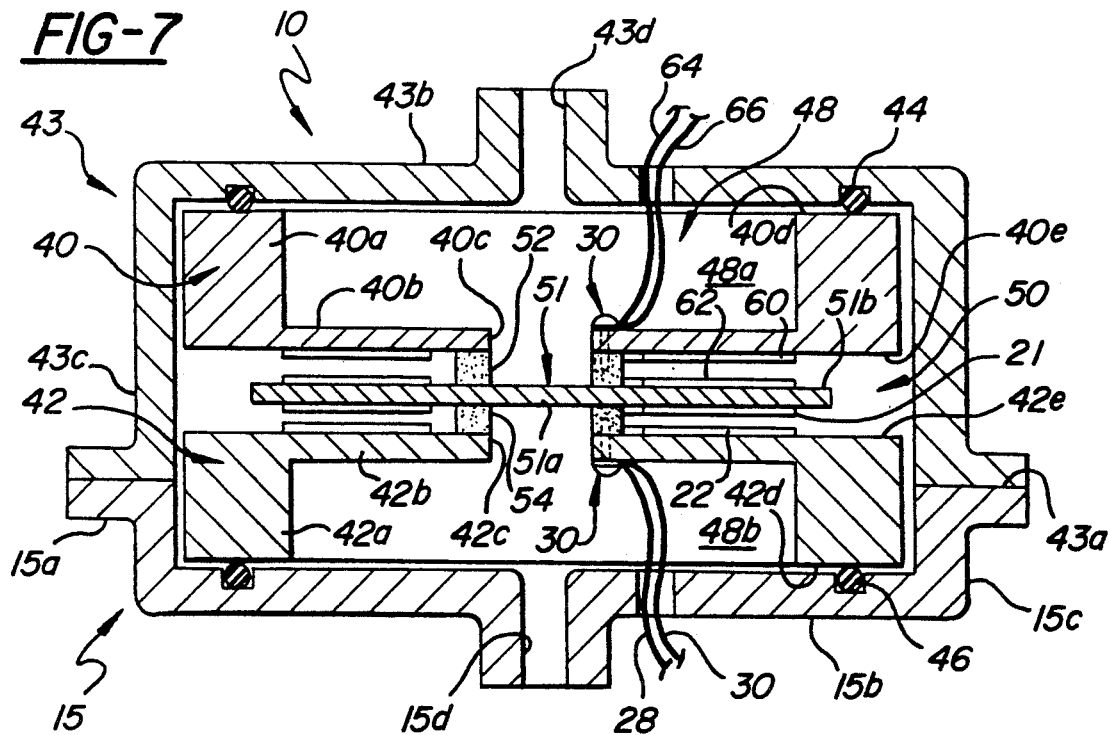
FIGS. 7, 8, and 9 illustrate modified forms of the invention sensor.

In the embodiment of the invention seen in FIG. 7, upper and lower substrate members 40 and 42 are positioned within housing members 43 and 15. Each substrate member has a generally circular cup-shaped configuration and is preferably formed of a ceramic material such as alumina.

Substrate member 40 includes a relatively thick outer annular portion 40a seated within the inner periphery of side wall 43c of upper housing member 43 and a relatively thin annular ledge or lip portion 40b extending radially inwardly in cantilever fashion from outer portion 40a and defining a central aperture 40c. The upper annular face 40d of outer annular portion 40a seats against an O-ring 44 positioned in a groove in the upper wall 43b of the upper housing member 43.

Substrate member 42 includes a relatively thick outer annular portion 42a and a relatively thin ledge or lip portion 42b extending radially inwardly in cantilever fashion from outer portion 42a and defining a central aperture 42c in alignment with the central aperture 40c of the upper substrate member. The outer portion 42a of substrate member 42 is seated within the inner periphery of the side wall 15c of housing member 15 and the lower surface 42d of substrate portion 42a seats against an O-ring 46 seated in a groove in the bottom wall 15b of lower housing member 15.

The assembled housing members 43 and 15 and the assembled substrate members 40 and 42 coact to define a central pressure chamber 48 within the housing assembly as well as an annular supplemental measurement chamber 50.

A diaphragm 51 is positioned in sandwich fashion between annular ledge portions 40b and 42b and is respectfully sealed to the underface of ledge 40b proximate opening 40c and to the upper face of ledge 42b proximate opening 42c by annular glass frits 52 and 54. Diaphragm 51 thus divides pressure chamber 48 into an upper pressure chamber 48a in communication with pressure port 43d and a lower pressure chamber 48b in communication with pressure port 15d with the central portion 51a of the diaphragm exposed to the upper and lower pressure chambers and the annular outer portion 51b of the diaphragm positioned within annular measurement chamber 50. Annular electrodes 21 and 22 are suitably positioned on the lower face of diaphragm annular portion 51b and on the confronting upper face 42e of substrate member 42 with each electrode including a radially inwardly extending lead portion coacting with a pin structure 30 and with leads 28 and 30, in the manner described with reference to the FIGS. 1–6 embodiment, to provide a measuring circuit having a value that will vary in response to variations in the spacing between the annular electrodes 20 and 21.

The embodiment of FIG. 7, in addition, includes a second set of annular electrodes 60 and 62 positioned respectively on the upper face of diaphragm portion 51b and on the lower face 40e of upper substrate member 40 and each including a radially inwardly extending lead portion for coaction with a pin structure 30 and with leads 64 and 66 to provide, in the manner described with reference to the FIGS. 1–6 embodiment, a measurement circuit having a value which will vary in response to variations in the spacing between electrodes 60 and 62.

In the use of the FIG. 7 embodiment, the pressure ports 43d and 15d are respectively connected to respective gas or fluid mediums so that the central or primary portion 51a of the diaphragm will flex upwardly or downwardly in proportion to the difference in the pressures of the sensed mediums and so that the annular outer peripheral portion 51b of the diaphragm will flex upwardly or downwardly to vary the spacing between electrodes 21 and 22 and 60 and 62 in proportion to the sensed pressure differential and thereby vary the output signal generated in the circuit including the leads 28 and 30 as well as in the circuit including the lead 64 and 66 so that changes in the respective circuits as well as changes between the respective circuits may be analyzed and differentiated in a manner to provide an indication of the pressure differential being experienced across the diaphragm. Note that in the embodiment of FIG. 7 the electrodes 22 and 60 carried by the respective substrate members are totally positioned over the lip or ledge portions of the substrate members so as to maximize the cantilever flexing movement of the lip portions of the substrate members in response to a sensed pressure differential and thereby augment the sensitivity of the sensor to a given pressure differential.

Figure 8:
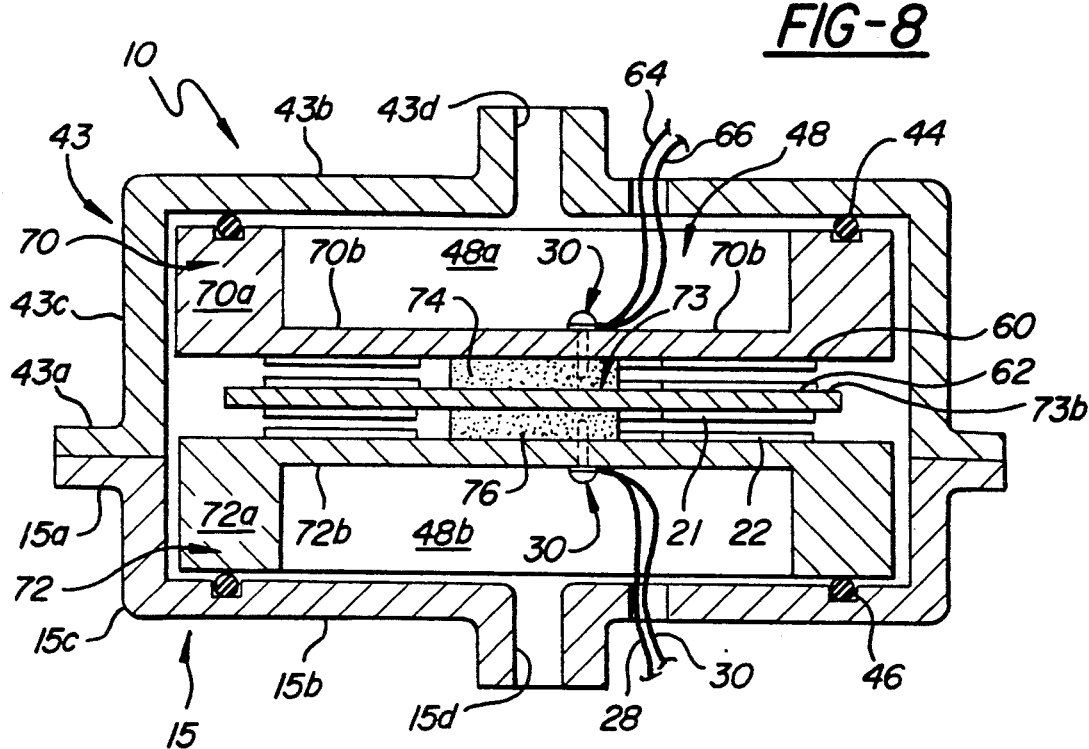

The sensor seen in FIG. 8 includes upper and lower housing members 43 and 15 as well as upper and lower substrate members 70 and 72 having a generally cylindrical cup-shaped configuration and including outer relatively thick annular outer portions 70a and 72a as well as relatively thin central portions 70b and 72b. However, in this embodiment, the central portions 70b and 72b of the upper and lower substrate members do not include a central aperture but rather completely fill the area within the annular outer portions 70a and 72a so that the portions 70b and 72b comprise portions of a diaphragm assembly extending across the pressure chamber 48 and dividing the pressure chamber into an upper pressure chamber portion 48a in communication with port 43d and a lower pressure chamber 48b in communication with port 15d.

The diaphragm assembly of the FIG. 8 embodiment further includes a diaphragm 73 sandwiched between substrate portions 70b and 72b and connected thereto by a cylindrical upper frit structure 74 and a cylindrical lower frit structure 76. As with the FIG. 7 embodiment, a first pair of annular electrodes 21 and 22 are respectively positioned on the undersurface of diaphragm 73 and on the confronting upper surface of substrate 72 and a second pair of electrodes 60 and 62 are respectively positioned on the upper face of diaphragm portion 73b and the confronting undersurface of substrate 70 and pin assemblies 30 coact with radially extending lead portions of the respective electrodes so as to provide an indication of variations in the spacing between electrodes 21 and 22 via leads 28 and 30 and provide an indication of variations in the spacing between electrodes 60 and 62 via leads 64 and 66 so that the circuits embodying the respective leads can be analyzed and differentiated to obtain an indication of the differential in pressure applied across the diaphragm assembly by the pressure differentials in upper pressure chamber 48a and lower pressure chamber 48b. It will be understood that in the FIG. 8 embodiment the entire diaphragm assembly 70b, 73, 72b flexes upwardly and downwardly in response to pressure differentials applied across the diaphragm assembly to thereby vary the spacing between electrodes 21 and 22 and 60 and 62 to provide variations in a relevant value in the associated measuring circuits to provide an indication of the magnitude of the pressure differential.

Figure 9:
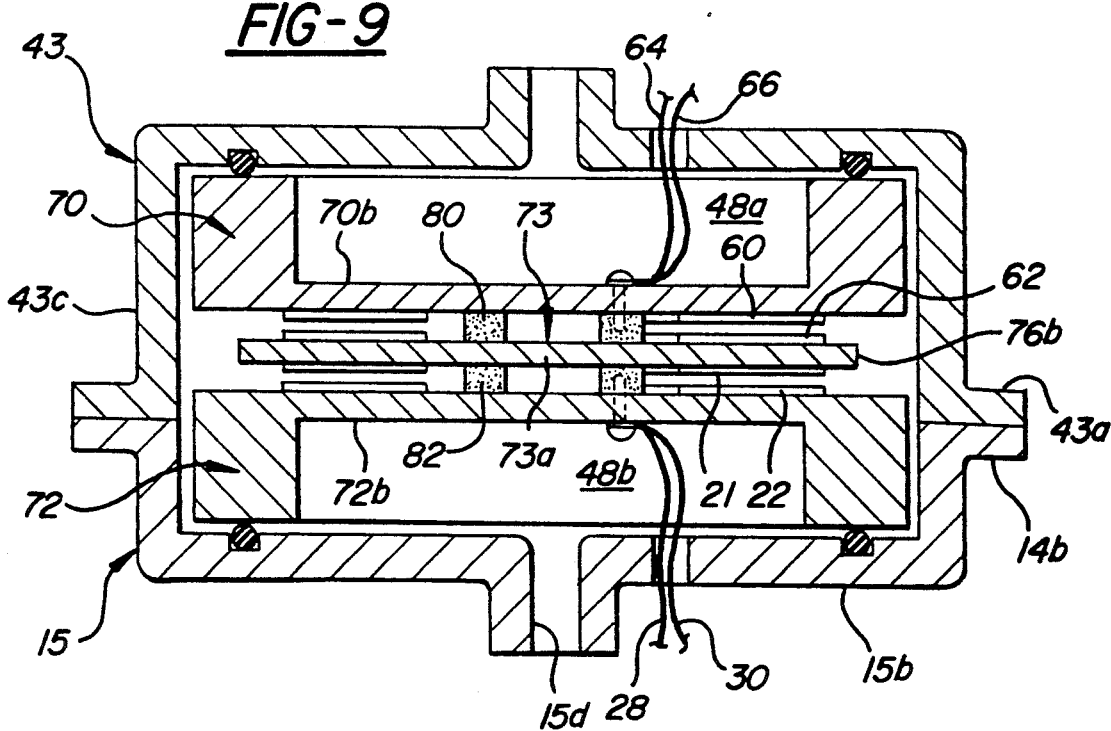

The embodiment of the invention seen in FIG. 9 is identical to the embodiment seen in FIG. 8 with the exception that the frits 80 and 82 interconnecting the diaphragm 11 and the substrate portions 70b and 72b comprise annular structures surrounding a central diaphragm portion 73a.

The invention will be seen to provide an extremely simple and extremely inexpensive capacitive sensor and, specifically, a capacitive sensor in which the electrodes of the sensor are totally isolated from the gas medium whose pressure is being sensed so that, for example, in the use of the invention sensor in an exhaust gas recirculation system for a motor vehicle, the impurities in the exhaust gases are totally isolated from the electrodes so as to avoid deposit of exhaust gas impurities between the electrodes with resultant inaccuracies in the output signal of the sensor.

Whereas preferred embodiments of the invention has been illustrated and described in detail it will be apparent that various changes may be made in the disclosed embodiment without departing from the scope or spirit of the invention.

I claim:

1. A sensor comprising a housing assembly defining a pressure chamber and a measurement chamber sealed from the pressure chamber, and a diaphragm assembly having a primary portion positioned in the pressure chamber and a supplemental free edge portion positioned in the measurement chamber.

2. A sensor according to claim 1 wherein the sensor is of the capacitive type and includes an electrical circuit including a pair of electrodes with one electrode carried by the supplemental free edge of the diaphragm assembly.

3. A sensor comprising a housing assembly defining a hollow, sealing means dividing the hollow into a pressure chamber and a measurement chamber, and a diaphragm passing through the sealing means to position a primary and a supplemental free edge portion of the diaphragm respectively in the pressure chamber and in the measurement chamber.

4. A sensor according to claim 3 wherein the sensor is of the capacitive type and includes an electrical circuit including a pair of electrodes with one electrode carried by the supplemental portion of the diaphragm assembly.

5. A sensor according to claim 4 wherein said one electrode is carried by one face of the supplemental diaphragm portion and the sensor further includes a second pair of electrodes with one electrode of the second pair carried by an opposite face of the supplemental diaphragm portion.

6. A sensor according to claim 5 wherein said measurement chamber is annular and said electrodes are annular.

7. A sensor according to claim 3 wherein the sealing means is annular, the measurement chamber is annular, and the supplemental diaphragm portion is annular and surrounds the primary diaphragm portion.

8. A sensor according to claim 7 wherein the electrodes are annular with one of the electrodes carried by the annular supplemental diaphragm portion and the other electrode carried by a confronting portion of the housing assembly.

9. A capacitive pressure sensor of the type including a housing assembly defining a pressure chamber, a diaphragm assembly positioned within the pressure chamber and adapted to deflect in response to a sensed pressure, and a pair of electrodes movable relative to each other in response to deflection of the diaphragm assembly to vary the output signal of an electrical circuit including the electrodes and thereby provide an electrical output signal proportional to the sensed pressure, characterized in that the housing assembly further defines a measurement chamber sealed from the pressure chamber and the diaphragm includes a primary portion positioned in the pressure chamber and flexing in response to variations in the sensed pressure and a supplemental portion positioned in the measurement chamber, carrying one of the electrodes, and flexing in response to flexing of the primary portion to vary the spacing between the electrodes and thereby vary the output signal of the electrical circuit.

10. A sensor according to claim 9 wherein the measurement chamber is annular and the supplemental diaphragm portion is annular.

11. A sensor according to claim 10 wherein the sensor includes annular sealing means sealing the pressure chamber from the measurement chamber and the diaphragm passes through the sealing means.

12. A sensor according to claim 11 wherein the electrodes are annular with one of the electrodes carried by the annular supplemental diaphragm portion and the other electrode carried by a confronting portion of the housing assembly.

13. A capacitive pressure sensor of the type including a housing assembly defining a pressure chamber, a diaphragm assembly positioned within the pressure chamber and adapted to deflect in response to a sensed pressure, and a pair of electrodes movable relative to each other in response to deflection of the diaphragm assembly to vary the output signal of an electrical circuit including the electrodes and thereby provide an electrical output signal proportional to the sensed pressure, characterized in that the diaphragm assembly includes upper and lower diaphragm portions spaced apart to define a measurement chamber therebetween and a central diaphragm portion sandwiched between the upper and lower portions and positioned in the measurement chamber, and the central diaphragm portion carries one of the electrodes and flexes in response to flexing of the upper and lower diaphragm portions to vary the spacing between the electrodes and thereby vary the output signal of the electrical circuit.

14. A sensor according to claim 13 wherein the measurement chamber is annular and the electrodes are annular.

15. A sensor of the capacitive type comprising a housing assembly defining a pressure chamber and a measurement chamber sealed from the pressure chamber, a diaphragm assembly having a primary portion positioned in the pressure chamber and a supplemental portion positioned in the measurement chamber, and an electrical circuit including a pair of electrodes with one electrode carried by the supplemental portion of the diaphragm assembly, the primary portion of the diaphragm assembly being adapted to flex in response to variations in the sensed pressure, the supplemental portion of the diaphragm assembly flexing in response to flexing of the primary portion, and flexing of the supplemental diaphragm assembly portion varying the spacing between the pair of electrodes to thereby vary the output signal of the electrical circuit.

16. A sensor according to claim 15 wherein the measurement chamber is annular and the supplemental diaphragm assembly portion is annular.

17. A sensor according to claim 16 wherein the electrodes are annular with one of the electrodes carried by the annular supplemental diaphragm assembly portion and the other electrode carried by a confronting portion of the housing assembly.

18. A sensor according to claim 17 wherein the sensor includes annular sealing means sealing the annular measurement chamber from the pressure chamber and the diaphragm passes through the sealing means.

19. A sensor of the capacitive type comprising a housing assembly defining a hollow, sealing means dividing the hollow into a pressure chamber and a measurement chamber, a diaphragm passing through the sealing means to position primary and supplemental portions of the diaphragm respectively in the pressure chamber and the measurement chamber, and an electrical circuit including a pair of electrodes with one electrode carried by the supplemental portion of the diaphragm assembly, the primary diaphragm portion being adapted to flex in response to variations in the sensed pressure, the supplemental diaphragm portion flexing in response to flexing of the primary diaphragm portion, and flexing of the supplemental diaphragm portion varying the spacing between the pair of electrodes to thereby vary the output signal of the electrical circuit.

* * * * *